No. 611,584. Patented Sept. 27, 1898.
J. T. TRENCH.
PNEUMATIC TIRE.
(Application filed May 11, 1896.)
(No Model.)

WITNESSES:
A. Millward Flach.
William H. James.

INVENTOR.
John Townsend Trench.
By Robert E. Phillips
his Attorney.

UNITED STATES PATENT OFFICE.

JOHN TOWNSEND TRENCH, OF KENMARE, IRELAND, ASSIGNOR TO THE TRENCH TUBELESS TYRE COMPANY, LIMITED, OF LONDON, ENGLAND.

PNEUMATIC TIRE.

SPECIFICATION forming part of Letters Patent No. 611,584, dated September 27, 1898.

Application filed May 11, 1896. Serial No. 591,026. (No model.)

*To all whom it may concern:*

Be it known that I, JOHN TOWNSEND TRENCH, a subject of the Queen of Great Britain, residing at Kenmare, county of Kerry, Ireland, have invented a new and useful Improvement in Pneumatic Tires, of which the following is a specification.

This invention relates to an improved construction of that type of tire consisting of a single tube divided longitudinally along its inner or under side and having its divided edges arranged so as to be self-closing, thus making the tube capable of containing air under pressure when placed in the wheel-rim without the use of an independent air-tube.

Figure 1:
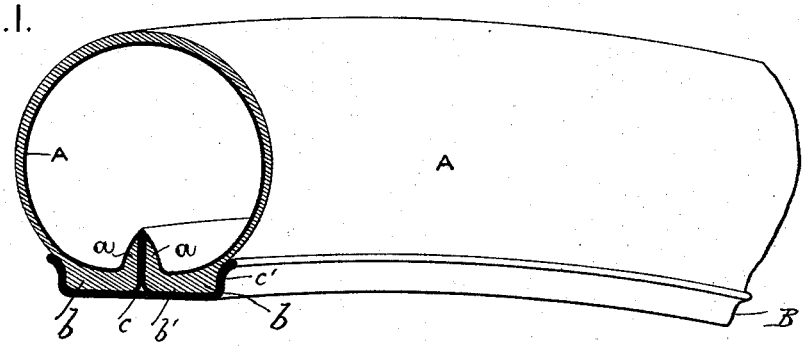
Figure 2:
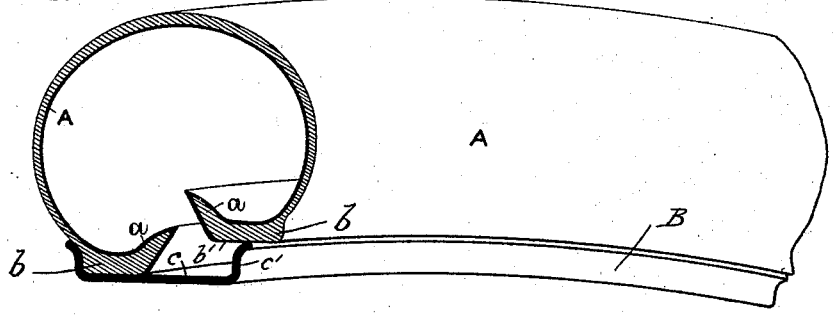

In the accompanying drawings, which illustrate this invention, Figure 1 is a view in transverse section of a tire embodying my invention in position on the wheel-rim. Fig. 2 is a view in transverse section of the tire, showing one of its edges displaced to enable the tire to be opened for repair.

The tire consists of a tube A, made of rubber and canvas or other reinforcing fabric and divided along its inner or under side. On the divided edges of the tube are formed or fixed lips $a\ a$, which are adapted when the tire is seated in the wheel-rim, as shown by Fig. 1, to bed and press against each other, and thus form an air-tight joint.

In order that the lips $a\ a$ may press against each other sufficiently tight to make an air-tight joint before air is introduced into the tire, they are molded or otherwise formed so that they slope outward, as shown by Fig. 2, before the tire is seated in the wheel-rim. When, therefore, the tire is placed in its final position in the wheel-rim, as shown by Fig. 1, the lips are pressed tightly into contact with each other by their inherent elasticity, thus insuring a firm and tight joint before air is introduced into the tire.

The lips $a\ a$ are preferably of a tapered or coned shape, as shown, so that when they are together they form a wedge-shaped internal rib on which the air-pressure within the tire acts to press them more securely together.

The wheel-rim B is channel-shaped and is provided with a flat bottom portion $c$ and side flanges $c'$. The tire has heels $b$ for bearing against the flanges $c'$ and flat portions $b'$ between the said heels $b$ and lips $a$ for bearing on the bottom of the rim.

The lips $a\ a$ may either be molded or formed in one piece with the cover A or they may be made in independent strips and be cemented or otherwise fixed to the tire after it is made or built up. By this latter construction my invention may be applied to the covers of well-known types of tires, enabling the separate air-tube to be dispensed with.

I am aware that divided single-tube tires adapted to contain air under pressure without the use of separate air-tubes have already been made, and I do not, therefore, claim such broadly; but What I do claim, and desire to secure by Letters Patent, is—

1. The combination, with a flanged wheel-rim, of a single-tube pneumatic tire divided on its under side and provided with heels $b$ for engaging with the flanges of the rim, and having inwardly-projecting lips $a$ wedge-shaped in cross-section, the meeting surfaces of the said lips being arranged at an angle to each other when their points only are in contact and becoming radial of the tube when pressed together, thereby sealing the joint and securing the said heels in the rim before inflation, substantially as set forth.

2. The combination, with a wheel-rim provided with flanges at its side edges; of a single-tube pneumatic tire divided on its under side and provided with tread portions $b'$ for bearing on the wheel-rim, a heel $b$ at one end of each tread portion for bearing against one of the rim-flanges, and a wedge-shaped inwardly and upwardly projecting lip at the other end of each tread portion, said lips operating to seal the joint and lock the tire in the rim before inflation, substantially as set forth.

JOHN TOWNSEND TRENCH.

Witnesses:
ROBERT E. PHILLIPS,
WILLIAM H. JAMES.